United States Patent
Boardman et al.

(10) Patent No.: US 9,528,702 B2
(45) Date of Patent: Dec. 27, 2016

(54) SYSTEM HAVING A COMBUSTOR CAP

(71) Applicant: General Electric Company, Schenectady, NY (US)

(72) Inventors: Gregory Allen Boardman, West Chester, OH (US); Michael John Hughes, Pittsburgh, PA (US); Johnie Franklin McConnaughhay, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 347 days.

(21) Appl. No.: 14/186,016

(22) Filed: Feb. 21, 2014

(65) Prior Publication Data

US 2015/0241064 A1     Aug. 27, 2015

(51) Int. Cl.
    *F23R 3/28*            (2006.01)
    *F23R 3/10*            (2006.01)

(52) U.S. Cl.
    CPC ............... *F23R 3/283* (2013.01); *F23R 3/10* (2013.01); *F23R 3/286* (2013.01); *Y02T 50/675* (2013.01)

(58) Field of Classification Search
    CPC ............. F02C 7/12; F02C 7/18; F02C 7/222; F05D 2260/22141; F23R 3/002; F23R 3/10; F23R 3/28; F23R 3/283; F23R 3/286; F23R 2900/03045
    See application file for complete search history.

(56) References Cited

U.S. PATENT DOCUMENTS

| | | | | |
|---|---|---|---|---|
| 4,686,823 A | * | 8/1987 | Coburn | F23R 3/283 60/740 |
| 4,864,827 A | * | 9/1989 | Richardson | F23R 3/002 60/755 |
| 4,870,818 A | * | 10/1989 | Suliga | F23R 3/283 60/740 |
| 4,934,145 A | * | 6/1990 | Zeisser | F23R 3/283 60/740 |
| 5,235,813 A | | 8/1993 | McVey et al. | |
| 5,638,675 A | | 6/1997 | Zysman et al. | |
| 5,638,682 A | * | 6/1997 | Joshi | F23D 14/02 60/737 |
| 5,974,805 A | * | 11/1999 | Allen | F23R 3/002 60/740 |

(Continued)

OTHER PUBLICATIONS

U.S. Appl. No. 14/186,157, filed Feb. 21, 2014, Hughes et al.

*Primary Examiner* — Jason L Vaughan
(74) *Attorney, Agent, or Firm* — Fletcher Yoder, P.C.

(57) ABSTRACT

A system includes a combustor cap assembly for a multi-tube fuel nozzle. The combustor cap assembly includes a support structure defining an interior volume configured to receive an air flow. The combustor cap assembly also includes multiple mixing tubes disposed within the interior volume, wherein each mixing tube is configured to mix air and fuel to form an air-fuel mixture. The combustor cap assembly further includes a combustor cap removably coupled to the support structure. The combustor cap includes multiple nozzles integrated within the combustor cap. Each nozzle of the multiple nozzles is coupled to a respective mixing tube of the multiple mixing tubes. The combustor cap is configured to internally cool itself via one or more cooling features integrated within the combustor cap.

19 Claims, 7 Drawing Sheets

(56) References Cited

U.S. PATENT DOCUMENTS

| | | | | |
|---|---|---|---|---|
| 6,530,223 | B1 * | 3/2003 | Dodds | F23R 3/343 60/39.826 |
| 6,871,501 | B2 * | 3/2005 | Bibler | F23R 3/002 60/737 |
| 6,877,960 | B1 | 4/2005 | Presz, Jr. et al. | |
| 6,880,340 | B2 * | 4/2005 | Saitoh | F23D 14/70 60/737 |
| 6,898,937 | B2 * | 5/2005 | Stuttaford | F23R 3/286 60/737 |
| 7,137,254 | B1 | 11/2006 | Dmitrievich et al. | |
| 7,694,899 | B2 | 4/2010 | Gerakis et al. | |
| 8,127,553 | B2 | 3/2012 | Ekkad et al. | |
| 8,181,891 | B2 * | 5/2012 | Ziminsky | F23D 14/48 239/132 |
| 8,205,452 | B2 * | 6/2012 | Boardman | F23R 3/12 60/737 |
| 8,307,660 | B2 * | 11/2012 | Stewart | F23C 7/006 60/748 |
| 8,479,519 | B2 * | 7/2013 | Chen | F23D 14/78 60/740 |
| 8,616,003 | B2 | 12/2013 | Hollon et al. | |
| 8,701,419 | B2 * | 4/2014 | Hughes | F23R 3/286 60/737 |
| 8,800,288 | B2 * | 8/2014 | Kidder | F02C 3/14 60/725 |
| 8,800,289 | B2 * | 8/2014 | Johnson | F01D 9/023 60/737 |
| 8,938,971 | B2 | 1/2015 | Poyyapakkam et al. | |
| 9,175,857 | B2 * | 11/2015 | Melton | F23R 3/10 |
| 9,194,587 | B2 | 11/2015 | Prade et al. | |
| 2009/0184181 | A1 | 7/2009 | Berry et al. | |
| 2010/0263384 | A1 * | 10/2010 | Chila | F23R 3/10 60/755 |
| 2012/0285173 | A1 | 11/2012 | Poyyapakkam et al. | |
| 2013/0219897 | A1 | 8/2013 | Nakamura et al. | |
| 2014/0060060 | A1 | 3/2014 | Bernero et al. | |

* cited by examiner

SYSTEM HAVING A COMBUSTOR CAP

BACKGROUND

The subject matter disclosed herein relates to combustors and, more specifically, to a combustor cap of a gas turbine engine.

A gas turbine engine combusts a mixture of fuel and air to generate hot combustion gases, which in turn drive one or more turbine stages. In particular, the hot combustion gases force turbine blades to rotate, thereby driving a shaft to rotate one or more loads, e.g., an electrical generator. The gas turbine engine includes one or more fuel nozzle assemblies to inject fuel and air into a combustor. The design and construction of the fuel nozzle assembly can significantly impact exhaust emissions (e.g., nitrogen oxides, carbon monoxide, etc.) as well as the life of components of the fuel nozzle assembly. Furthermore, the design and construction of the fuel nozzle assembly can significantly affect the time, cost, and complexity of installation, removal, maintenance, and general servicing. Therefore, it would be desirable to improve the design and construction of the fuel nozzle assembly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a combustor cap assembly for a multi-tube fuel nozzle. The combustor cap assembly includes a support structure defining an interior volume configured to receive an air flow. The combustor cap assembly also includes multiple mixing tubes disposed within the interior volume, wherein each mixing tube is configured to mix air and fuel to form an air-fuel mixture. The combustor cap assembly further includes a combustor cap removably coupled to the support structure. The combustor cap includes multiple nozzles integrated within the combustor cap. Each nozzle of the multiple nozzles is coupled to a respective mixing tube of the multiple mixing tubes. The combustor cap is configured to internally cool itself via one or more cooling features integrated within the combustor cap.

In accordance with a second embodiment, a system includes a combustor cap configured to be coupled to multiple mixing tubes of a multi-tube fuel nozzle. Each mixing tube of the multiple mixing tubes is configured to mix air and fuel to form an air-fuel mixture. The combustor cap includes multiple nozzles integrated within the combustor cap. Each nozzle of the multiple nozzles is configured to couple to a respective mixing tube of the multiple mixing tubes. The combustor cap is configured to internally cool itself via one or more cooling features integrated within the combustor cap.

In accordance with a third embodiment, a system includes a combustor cap configured to be coupled to multiple mixing tubes of a multi-tube fuel nozzle. Each mixing tube is configured to mix air and fuel to form an air-fuel mixture. The combustor cap includes a first surface configured to face the multiple mixing tubes, a second surface disposed opposite the first surface and cooling cavities integrated within the combustor cap and configured to internally cool the combustor cap. Each of the cooling cavities includes an inlet disposed on the first surface and configured to receive impingement air flow into the combustor cap. One or more of the cooling cavities include an outlet disposed on the second surface and configured to enable the exit of the impingement air flow from the combustor cap.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
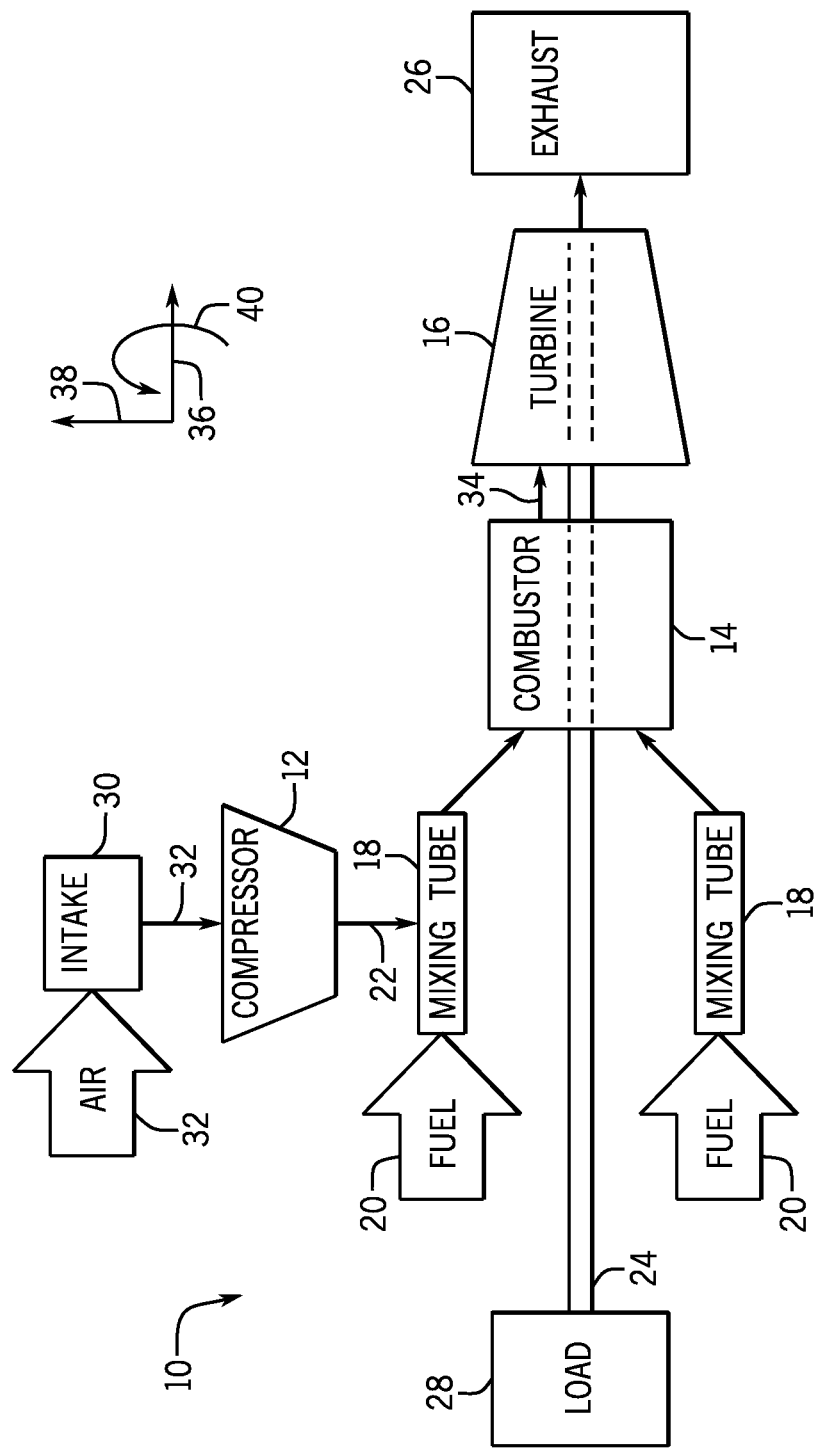
FIG. 1 is a block diagram of an embodiment of a turbine system having a multi-tube fuel nozzle.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a combustor cap assembly for a multi-tube fuel nozzle, wherein the combustor cap assembly includes internal cooling features. For example, a combustor cap assembly for a multi-tube fuel nozzle includes a support structure that defines an interior volume for receiving an air flow. The combustor cap assembly also includes multiple mixing tubes within the interior volume, wherein each tube is configured to mix air and fuel to form an air-fuel mixture. The combustor cap assembly also includes a combustor cap removably coupled to the support structure. The combustor cap includes multiple nozzles integrated within the combustor cap. Each nozzle is coupled to a respective mixing tube. The combustor cap is configured to internally cool itself via one or more cooling features integrated within the combustor cap. For example, the cooling features may include structures (e.g., acting as cooling fins) that extend radially inward from an inner surface of each nozzle into a flow path of the air-fuel mixture through the nozzle. In certain embodiments, the cooling features include cooling cavities disposed within the combustor cap adjacent one or more of the nozzles. These cooling cavities may include one or more inlets to receive impingement air (e.g., on a cool side of the combustor cap) and one or more outlets (e.g., on a hot side of the combustor cap) to enable a zero cross-flow impingement cooling (i.e., providing spent air an exit path that does not interfere or cross-flow with other impingement air flows downstream). The outlets may be disposed about a periphery of the combustor cap (or a periphery of a combustor cap sector) or near potential hot spots along the hot side of the combustor cap. In some embodiments, cooling channels may fluidly couple adjacent cooling cavities. These cooling channels may include structures (e.g., fins) that extend from an internal surface of the combustor cap to further promote cooling. The presently described system may lower manufacturing costs, extend equipment lifetime, and/or lower emissions, for example.

Turning to the drawings, FIG. 1 illustrates a block diagram of an embodiment of a turbine system 10. As described in detail below, the disclosed turbine system 10 (e.g., a gas turbine engine) may employ a combustor cap, described below, which may improve system durability, operability, and reliability. As shown, the system 10 includes a compressor 12 (e.g., with one or more compression stages), one or more turbine combustors 14, and a turbine 16 (e.g., with one or more turbine stages). The turbine combustor 14 may include one or more mixing tubes 18, e.g., in one or more multi-tube fuel nozzles, configured to receive both fuel 20 and pressurized oxidant 22, such as air, oxygen, oxygen-enriched air, oxygen reduced air, or any combination thereof. Although the following discussion refers to the oxidant as the air 22, any suitable oxidant may be used with the disclosed embodiments. The mixing tubes 18 may be described as micromixing tubes, which may have diameters between approximately 0.5 to 15 centimeters. For example, the diameters of the tubes 18 may range between approximately 0.5 to 2, 0.75 to 1.75, 1 to 1.5, 0.5 to 5, 5 to 10, or 10 to 15 centimeters, and all subranges therebetween. The mixing tubes 18 may be arranged in one or more bundles of closely spaced tubes, generally in a parallel arrangement relative to one another. In this configuration, each mixing tube 18 is configured to mix (e.g., micromix) on a relatively small scale within each mixing tube 18, which then outputs a fuel-air mixture into the combustion chamber. In certain embodiments, the system 10 may include between 2 and 1000 mixing tubes 18, and the system 10 may use a liquid fuel and/or gas fuel 20, such as natural gas or syngas. Furthermore, the combustor 14 may contain a cap assembly described in more detail in FIG. 2 that includes a removable combustor cap, a support structure, and/or mixing tubes 18.

The combustor cap may include internal cooling features to lower manufacturing costs, extend equipment lifetime, and/or lower emissions.

Compressor blades are included as components of the compressor 12. The blades within the compressor 12 are coupled to a shaft 24, and will rotate as the shaft 24 is driven to rotate by the turbine 16, as described below. The rotation of the blades within the compressor 12 compresses air 32 from an air intake 30 into pressurized air 22. The pressurized air 22 is then fed into the mixing tubes 18 of the turbine combustors 14. The pressurized air 22 and fuel 20 are mixed within the mixing tubes 18 to produce a suitable fuel-air mixture ratio for combustion (e.g., a combustion that causes the fuel to more completely burn) so as not to waste fuel 20 or cause excess emissions.

The turbine combustors 14 ignite and combust the fuel-air mixture, and then pass hot pressurized combustion gasses 34 (e.g., exhaust) into the turbine 16. Turbine blades are coupled to the shaft 24, which is also coupled to several other components throughout the turbine system 10. As the combustion gases 34 flow against and between the turbine blades in the turbine 16, the turbine 16 is driven into rotation, which causes the shaft 24 to rotate. Eventually, the combustion gases 34 exit the turbine system 10 via an exhaust outlet 26. Further, the shaft 24 may be coupled to a load 28, which is powered via rotation of the shaft 24. For example, the load 28 may be any suitable device that may generate power via the rotational output of the turbine system 10, such as an electrical generator, a propeller of an airplane, and so forth. In the following discussion, reference may be made to an axial axis or direction 36, a radial axis or direction 38, and/or a circumferential axis or direction 40 of the turbine system 10.

Figure 2:
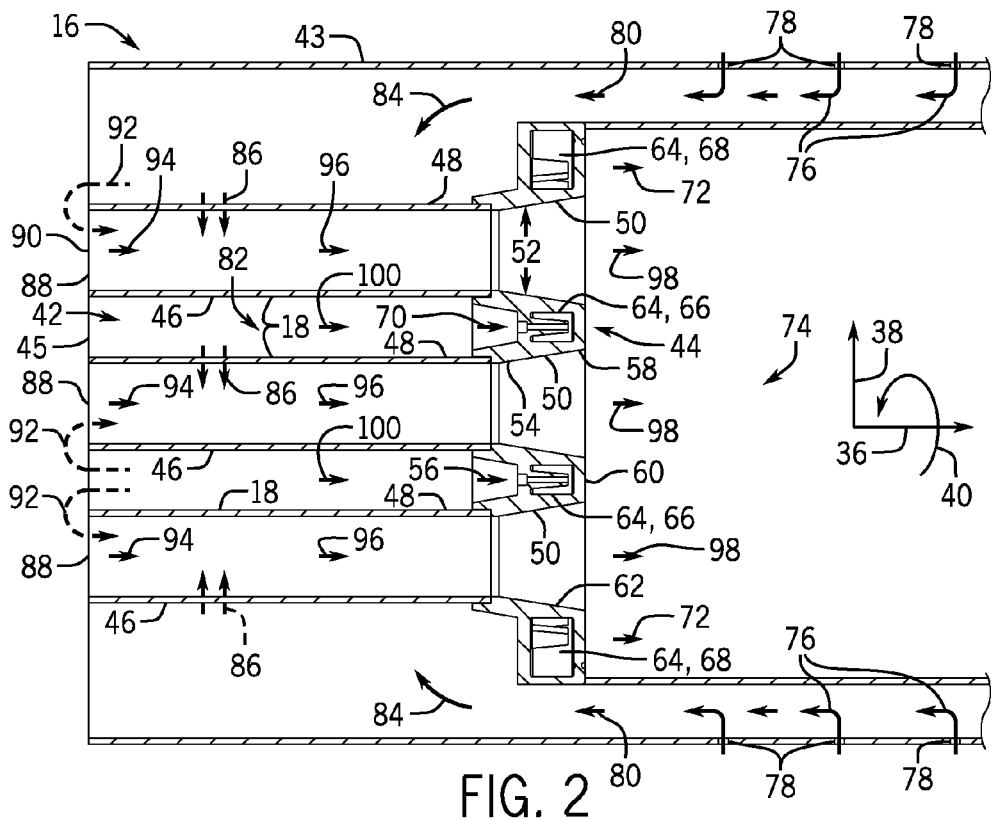
FIG. 2 is cross-sectional side view of an embodiment of a portion of a combustor of the turbine system of FIG. 1 having a combustor cap with internal cooling features.

FIG. 2 is a cross-sectional side view of a portion of the combustor 14 (e.g., combustor cap assembly) having a multi-tube fuel nozzle 42 and a combustor cap 44 with internal cooling features. The combustor 16 includes an outer casing or flow sleeve 43 (e.g., support structure) and an end cover 45. Multiple mixing tubes 18 are disposed or mounted within an internal volume of the outer casing 43 of the combustor 16. Each mixing tube 18 extends from an upstream end portion 46 (e.g., adjacent the end cover 45) to a downstream end portion 48 (e.g., adjacent the combustor cap 44). Each downstream end portion 48 of each mixing tube 18 is coupled, physically and thermally, to the combustor cap 44. As described in greater detail below, the combustor cap 44 includes cooling features (e.g., integrated within the cap 44). For example, the cooling features include nozzles 50 (e.g., cooling nozzles) integrated within the combustor cap 44. In certain embodiments, the cap 44 is hollow between and around the nozzles 50. Each downstream end portion 48 of each mixing tube 18 is coupled to a respective nozzle 50. A diameter 52 of each nozzle 50 generally expands or diverges in a downstream direction 36 (e.g., axial direction) from an upstream end 54 (e.g., adjacent the downstream end 48 of the mixing tube 18 and a cool side or face 56 of the cap 44) to a downstream end 58 (e.g., adjacent a hot side or face 60 of the cap 44). Both the mixing tubes 18 and their respective nozzles 50 act similar to heat transfer fins (e.g., convective cooling fin structure) to reduce the amount of air needed to cool the combustor cap 44 and/or to increase the amount of cooling for a given amount of airflow. In certain embodiments, each nozzle 50 may include structures that extend radially 38 inward from an inner surface 62 of the nozzle 50 into a flow path of an air-fuel mixture through the nozzle 50. In certain embodiments, these structures form a lobed cross-sectional shape for each nozzle 50 (see FIG. 6). In other embodiments, the cross-sectional shape of each nozzle 50 may be elliptical, rectilinear, or any other shape. The structures extending from the nozzles 50 may increase the surface are to increase the amount of convective cooling. In some embodiments, a thermal barrier coating (e.g., bonded ceramic) may disposed on the surface of the hot side 60 of the combustor cap 44. In other embodiments, a catalyst (e.g., disposed on ceramic materials) may be disposed on the surface of the hot side 60 of the combustor cap 44 to reduce emissions (e.g., CO, $NO_x$, etc.). Examples of the catalyst include oxides of base metals (e.g., vanadium, molybdenum, tungsten, etc.), zeolites, or various precious metals (e.g., platinum, palladium, rhodium, etc.).

The combustor cap 44 may also include other cooling features to enable the cap 44 to internally cool itself. For example, the combustor cap 44 may include cooling cavities 64 disposed within the cap 44 adjacent one or more of the nozzles 50. The number of cooling cavities 64 associated with a respective nozzle 50 may vary from 1 to 1000. In certain embodiments, one or more of the cavities 62 may include an inlet 66 (e.g., disposed on a surface of the cool side 56 of the cap 44) and/or an outlet 68 (e.g., disposed on a surface of the hot side 50 of the cap 44). The number of inlets 66 may vary from 2 to 1000. The number of outlets 68 may also vary from 2 to 1000. The inlets 66 are configured to receive an impingement air flow 70 into the combustor cap 44, while the outlets 68 are configured to enable the exit of the impingement air flow (e.g., spent impingement air flow) 72. In some embodiments, the inlets 66 and the outlets 68 of the cooling cavities 62 may be interconnected (e.g., fluidly coupled) via cooling channels (see FIG. 8). In certain embodiments, the cooling channels and/or cavities 62 may include a respective structure or fin that extends from an inner surface of the cap 44 adjacent the hot side 60 towards an inner surface of the cap 44 adjacent the cool side 56 of the cap 44 (e.g., opposite to direction 36). In certain embodiments, the outlets 68 may be disposed about a periphery of the hot side 60 of the cap 44 and/or at hot spots along the cap 44 (see FIGS. 6-8). In embodiments where the cap 44 may be divided in sectors, the outlets 68 may be disposed about a periphery of the hot side 60 of the respective sector of the cap 44 (see FIGS. 7-8). By locating the outlets 68 about the periphery or adjacent hot spots, the impingement air may be exhausted in those spots in greater need of cooling, while also minimizing interference with a combustion zone 74 downstream of the combustor cap 44. In other words, the spent impingement or cooling air may be routed and exhausted out strategically to minimize emissions, while improving turndown and flame stability. In certain embodiments, the cooling cavities 64 may include one or more raised structures (e.g., stalagmite-shaped structures or structures with tapered protrusions) that extend from an inner surface of the cool side of the cap 44 (e.g., in direction 36) (see FIG. 4). The raised structures may each include a respective inlet 66, outlet into the cooling cavity, and air passage through the raised structure. In certain embodiments, the raised structures may be a shape other than a stalagmite shape (e.g., rectilinear shape, cylindrical shape, triangular shape, etc.).

Air (e.g., compressed air) enters the flow sleeve 43 (as generally indicated by arrows 76) via one or more air inlets 78, and follows an upstream airflow path 80 in an axial direction (e.g., opposite direction 36) towards the end cover 45. Air then flows into an interior flow path 82, as generally indicated by arrows 84, and proceeds to enter the plurality of mixing tubes 18 as indicated by dashed arrows 86 into perforations through the tubes 18. In certain embodiments, the air may enter the mixing tubes 18 through an opening 88 disposed at an upstream end 90 of the upstream end portion 46 of each tube 18 as indicated by the dashed arrows 92. Fuel flows in the axial direction 36 into each tube 18 (e.g., via a fuel injector) as indicated by arrows 94. The air and fuel mix within the tubes 18 to form an air-fuel mixture that flows in the downstream direction 36 through the tubes towards the combustor cap 44 as indicated by arrows 96. The tubes 12 inject the air-fuel mixture via the nozzles 50 into the combustion region or zone 74 (e.g. as indicated by arrows 98) in a suitable ratio for desirable combustion, emissions, fuel consumption, and power output.

As discussed, the combustor cap 44 may include cooling features to enable internal cooling of itself. A portion of the air (e.g., compressed air) within the interior flow path 82 flows towards the combustor cap 44 as indicated by arrows 100. The air enters the inlets 66 (e.g., adjacent the cool side 56) of the combustor cap 44 as indicated by the arrows 70 and exits the outlets 68 (e.g., adjacent the hot side 60) into the combustion region 74. The internal cooling features of the combustor cap 44 enable uniform impingement cooling (e.g., zero cross-flow impingement cooling) that does not degrade due to cross-flow accumulation. Together, the cooling features of the combustor cap 44 also provide a simpler structure for the cap 44 (i.e., fewer parts), reduced costs, and longer life for components of the combustor 16.

Figure 3:
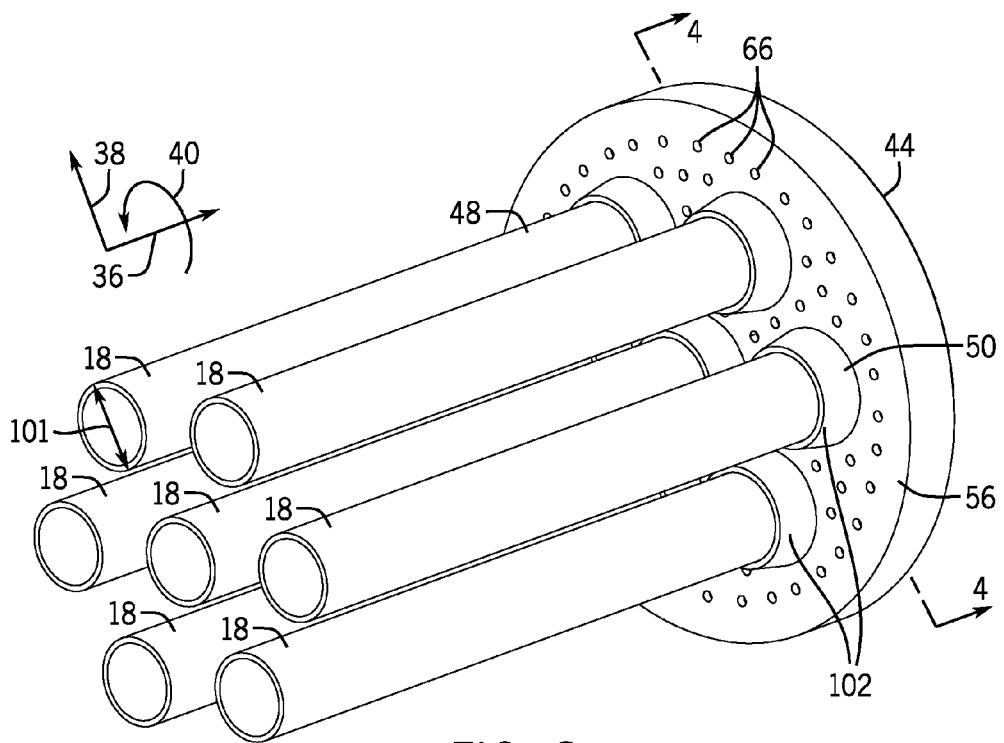
FIG. 3 is a perspective view of an embodiment of mixing tubes coupled to the combustor cap of FIG. 2.

FIG. 3 is a perspective view of an embodiment of the mixing tubes 18 coupled to the combustor cap 44. As depicted, the combustor cap 44 includes seven mixing tubes 18 coupled respectively to seven nozzles 50 of the combustor cap 44. The number of mixing tubes 18 may range from 2 to 500. Similarly, the number of nozzles 50 may correspond to the number of mixing tubes 18 and range from 2 to 500. Each tube 18 may include an outer diameter 101 ranging between approximately 0.5 to 15 centimeters. For example, the diameters 101 may range between approximately 0.5 to 2, 0.75 to 1.75, 1 to 1.5, 0.5 to 5, 5 to 10, or 10 to 15 centimeters, and all subranges therebetween. As depicted, the mixing tubes 18 are coupled to their respective nozzles 50 on the cool side 56 of the combustor cap 44. The nozzles 50 include a portion 102 that extends in a downstream direction (e.g., opposite direction 36) from the cool side 56 of the combustor cap 44. In certain embodiments, the portion 102 of each nozzle 50 may include internally a shoulder that abuts a downstream end of the downstream end portion 48 of the tube 18. Also, as depicted, a plurality of the inlets 66 is disposed on the cool side 56 of the combustor cap 44. The inlets 66 are disposed between and around the nozzles 50. The number of inlets 66 may vary from 2 to 1000. As depicted, the inlets 66 are elliptically shaped. In other embodiments, the inlets 66 may include different shapes (e.g., rectilinear, triangular, star-shaped, circular, polygonal, hexagonal, t-shaped, chevron shaped, or any combination thereof).

Figure 4:
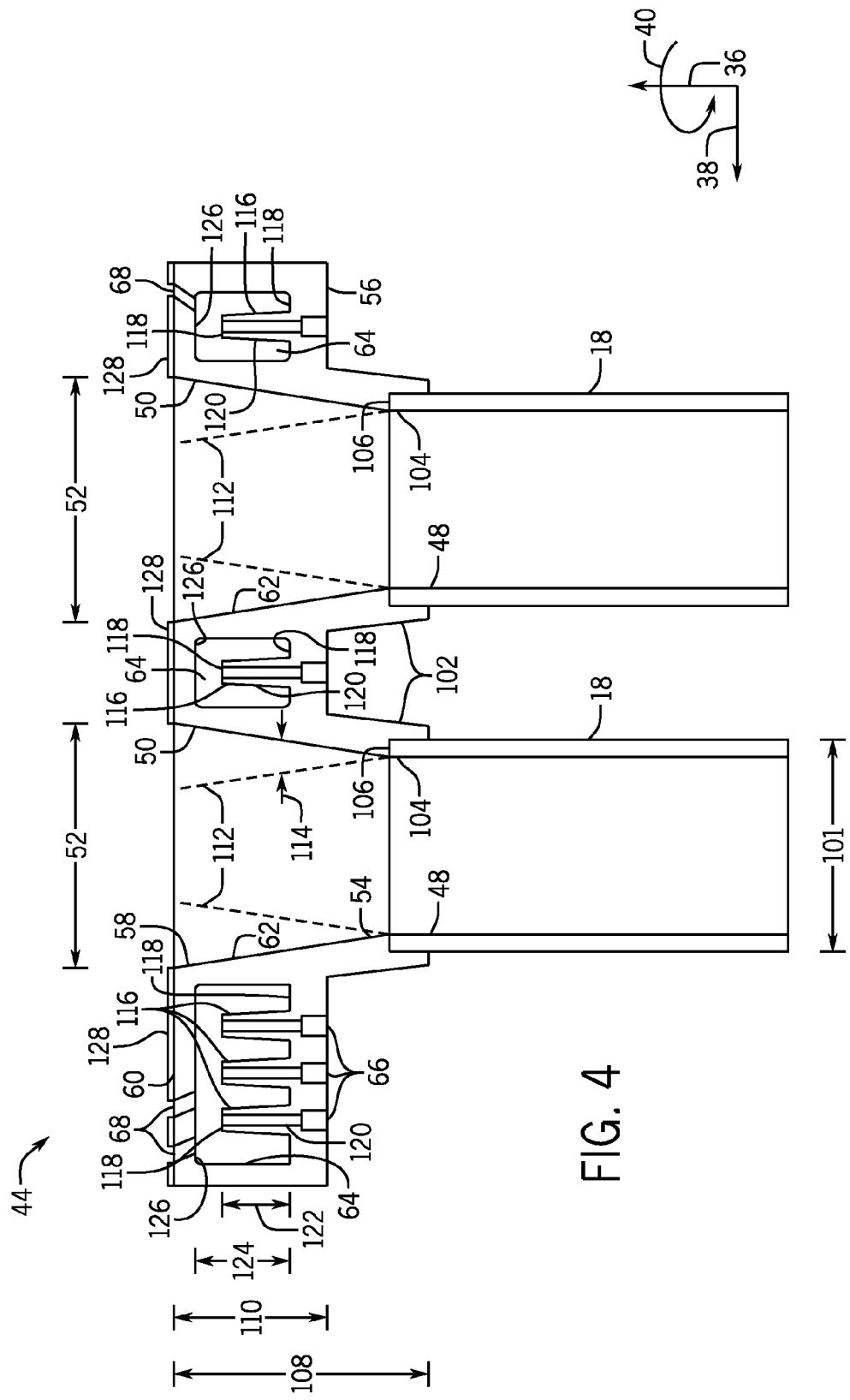
FIG. 4 is a cross-sectional side view of an embodiment of the combustor cap (e.g., having raised structures) of FIG. 3 coupled to the mixing tubes, taken along line 4-4.

FIG. 4 is a cross-sectional side view of an embodiment of the combustor cap 44 of FIG. 3 coupled to the mixing tubes 18, taken along line 4-4. The combustor cap 44 includes the nozzles 50 coupled to respective mixing tubes 18 via portion 102 of each nozzle 50. As depicted, a downstream end 104 of each tube 18 is coupled to a respective upstream end 54 (i.e., portion 102) of a respective nozzle 50. The downstream end 104 of each tube 18 abuts or interfaces with a respective shoulder 106 of a respective nozzle 50. In certain embodiments, the nozzles 50 may not include portion 102 and the mixing tube 18 may be removably or fixedly coupled (e.g., brazed, welded, threaded, etc.) directly to the nozzle 50 at the cool side 56 of the combustor cap 44. Each nozzle 50 includes the diameter 52 that generally expands or diverges in the downstream direction 36 (e.g., axial direction) from the upstream end 54 (e.g., adjacent the downstream end 48 of the mixing tube 18 and the cool side or face 56 of the cap 44) to the downstream end 58 (e.g., adjacent a hot side or face 60 of the cap 44) to form a conical or diverging annular-shaped surface. Each nozzle 50 also includes a length 108. The length 108 of each nozzle 50 may range from approximately 100 to 300 percent a length or height 110 of the other portion (i.e., without the nozzle 50) of the combustor cap 44. For example, the length 108 of the nozzle 50 may be approximately 100, 125, 150, 175, 200, 225, 250, 275, or 300 percent, or any other percent of the length 110. As mentioned above, both the mixing tubes 18 and their respective nozzles 50 act similar to heat transfer fins (e.g., convective cooling fin structure) to reduce the amount of air needed to cool the combustor cap 44. In certain embodiments, each nozzle 50 may include structures 112 (e.g., indicated by dashed lines) that extend radially 38 inward from the inner surface 62 of nozzle 50 into a flow path of an air-fuel mixture through the nozzle 50. A height 114 of the structures 112 may increase from the upstream end 54 to the downstream end 58. In certain embodiments, these structures 112 form a lobed cross-sectional shape for each nozzle 50 (see FIG. 6). In other embodiments, the cross-sectional shape of each nozzle 50 may be elliptical, rectilinear, or any other shape.

The combustor cap 44 is hollow between and around the nozzles 50. As depicted, the combustor cap 44 includes the cooling cavities 64 disposed adjacent to, between, and around the nozzles 50. The number of cooling cavities 64 associated with a respective nozzle 50 may vary from 1 to 30. As depicted, the cavities 64 include the inlet 66 (e.g., disposed on a surface of the cool side 56 of the cap 44). Also, one or more of the cavities include the outlet 68 (e.g., disposed on a surface of the hot side 50 of the cap 44). As described above, the inlets 66 are configured to receive an impingement air flow into the combustor cap 44, while the outlets 68 are configured to enable the exit of the impingement air flow (e.g., spent impingement air flow) 72. In some embodiments, the inlets 66 and the outlets 68 of the cooling cavities 62 may be interconnected (e.g., fluidly coupled) via cooling channels (see FIG. 8). In certain embodiments, the outlets 68 may be disposed about a periphery of the hot side 60 of the cap 44 and/or at hot spots along the cap 44. In embodiments where the cap 44 may be divided in sectors, the outlets 68 may be disposed about a periphery of the hot side 60 of the respective sector of the cap 44. By locating the outlets 68 in about the periphery or adjacent hot spots, the impingement air may be exhausted in those spots in greater need of cooling, while also minimizing interference with a combustion zone 74 downstream of the combustor cap 44. In other words, the spent impingement or cooling air may be routed and exhausted out strategically to minimize emissions, while improving turndown and flame stability.

As depicted, the cooling cavities 64 include one or more raised structures 116 (e.g., stalagmite-shaped structures, tapered hollow protrusions, or hollow conical protrusions) that extend from an inner surface 118 of the cool side 56 of the cap 44 (e.g., in direction 36). The raised structures 116 may each include a respective inlet 66, outlet 118 into the cooling cavity 64, and an air passage 120 through the raised structure 116. In certain embodiments, the raised structures 116 may include a shape other than the stalagmite shape (e.g., rectilinear shape, cylindrical shape, triangular shape, etc.). A length or height 122 of each structure 116 may range from approximately 5 to 90 percent a distance 124 between the inner surface 118 of the cool side 56 and an inner surface 126 of the hot side 60 of the combustor cap 44. For example, the length 108 of the nozzle 50 may be approximately 5, 10, 15, 20, 25, 30, 35, 40, 45, 50, 55, 60, 65, 70, 75, 80, 85, or 90 percent, or any other percent of the length 124. The internal cooling features (e.g., structures 116) of the combustor cap 44 enable uniform impingement cooling (e.g., zero cross-flow impingement cooling) that does not degrade due to cross-flow accumulation. Together, the cooling features (e.g., nozzle 50, structures 116, etc.) of the combustor cap 44 also provide a simpler structure for the cap 44 (i.e., fewer parts), reduced costs, and longer life for components of the combustor 16.

In addition, FIG. 4 depicts an outer coating 128 disposed on the hot side 60 of the combustor cap 44. In certain embodiments, the outer coating 128 includes a thermal barrier coating (e.g., bonded ceramic). In other embodiments, the outer coating 128 includes a catalyst (e.g., disposed on and/or in ceramic materials) to reduce emissions. Examples of the catalyst include oxides of base metals (e.g., vanadium, molybdenum, tungsten, etc.), zeolites, or various precious metals (e.g., platinum, palladium, rhodium, etc.).

Figure 5:
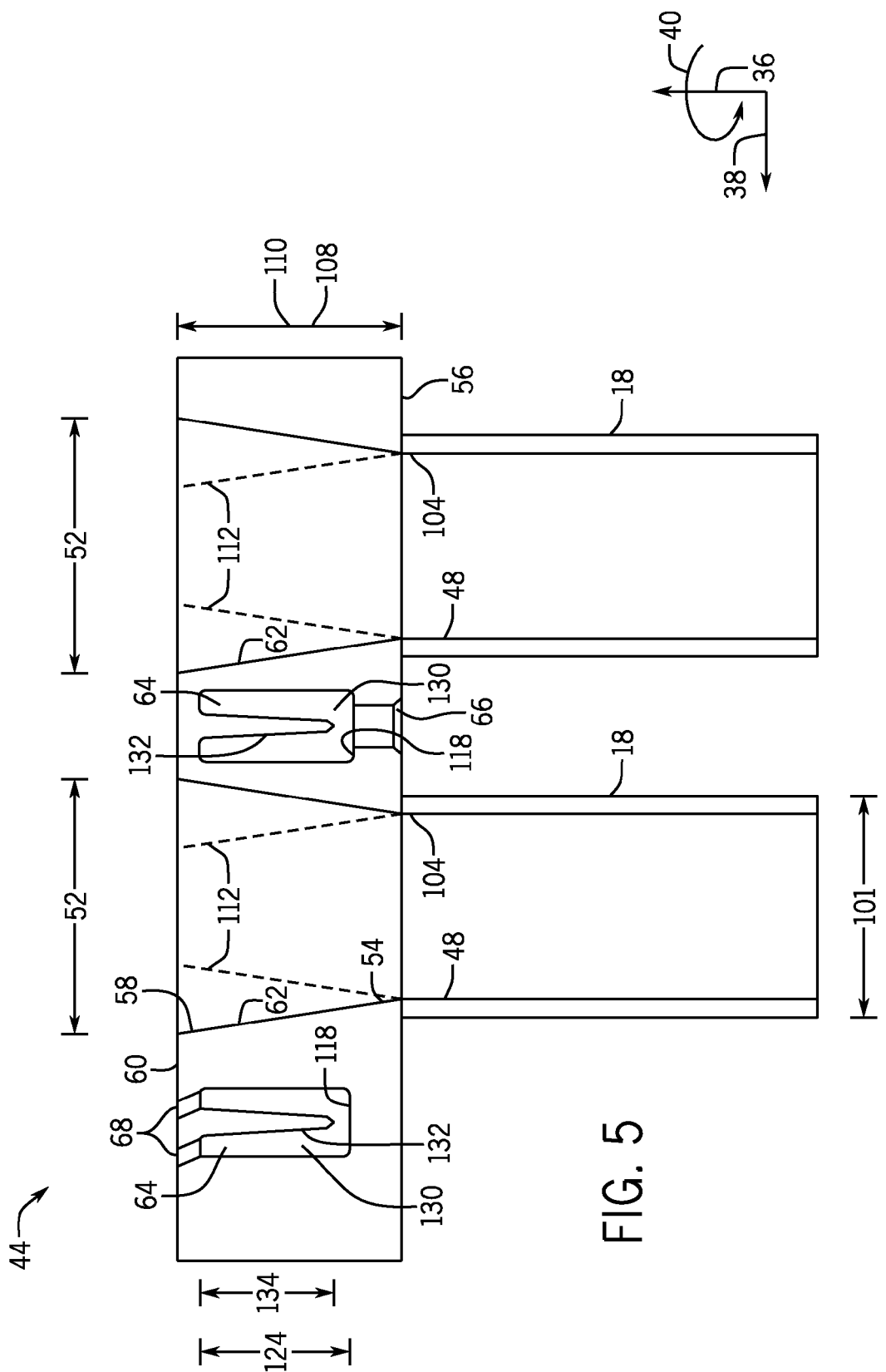
FIG. 5 is a cross-sectional side view of an embodiment of the combustor cap (e.g., having cooling fins) of FIG. 3 coupled to the mixing tubes, taken along line 4-4.

FIG. 5 is a cross-sectional side view of an embodiment of the combustor cap 44 of FIG. 3 coupled to the mixing tubes 18, taken along line 4-4. In general, the combustor cap 44 is as described in FIG. 4 with a few exceptions. As depicted, the nozzles 50 do not include portions 102 that extend beyond the cool side 56 of the combustor cap 44. Instead, the mixing tubes 18 are aligned with their respective nozzle 50 and removably or fixedly coupled (e.g., brazed, welded, threaded, etc.) onto the cool side 56 of the combustor cap 44. In other words, the downstream end 104 of the downstream end portion 104 of each tube 18 is directly brazed to the cool side 56 of the combustor cap 44. As a result, the length 108 of each nozzle 50 and the length 110 of the combustor cap 44 are the same. As mentioned above, the inlets 66 and the outlets 68 of the cooling cavities 62 may be interconnected (e.g., fluidly coupled) via cooling channels 130 (see FIG. 8). As depicted, the cooling channels 130 and/or cavities 62 include a respective structure or fin 132 that extends from the inner surface 126 of the cap 44 adjacent the hot side 60 towards the inner surface 118 of the cap 44 adjacent the cool side 56 of the cap 44 (e.g., opposite to direction 36). A length or height 134 of the fin 132 may range from approximately 5 to 90 percent the distance 124 between the inner surface 118 of the cool side 56 and an inner surface 126 of the hot side 60 of the combustor cap 44. For example, the length 134 of the fin 132 may be approximately 5, 10, 15, 20, 25, 30, 35, 40, 45, 50, 55, 60, 65, 70, 75, 80, 85, or 90 percent, or any other percent of the distance 124. The internal cooling features (e.g., fins 132) of the combustor cap 44 enable uniform impingement cooling (e.g., zero cross-flow impingement cooling) that does not degrade due to cross-flow accumulation. Together, the cooling features (e.g., nozzle 50, structures 116, etc.) of the combustor cap 44 also provide a simpler structure for the cap 44 (i.e., fewer parts), reduced costs, and longer life for components of the combustor 16. In certain embodiments, the combustor cap 44 may also include the outer coating 128 disposed on the hot side 60 as described above in FIG. 4.

Figure 6:
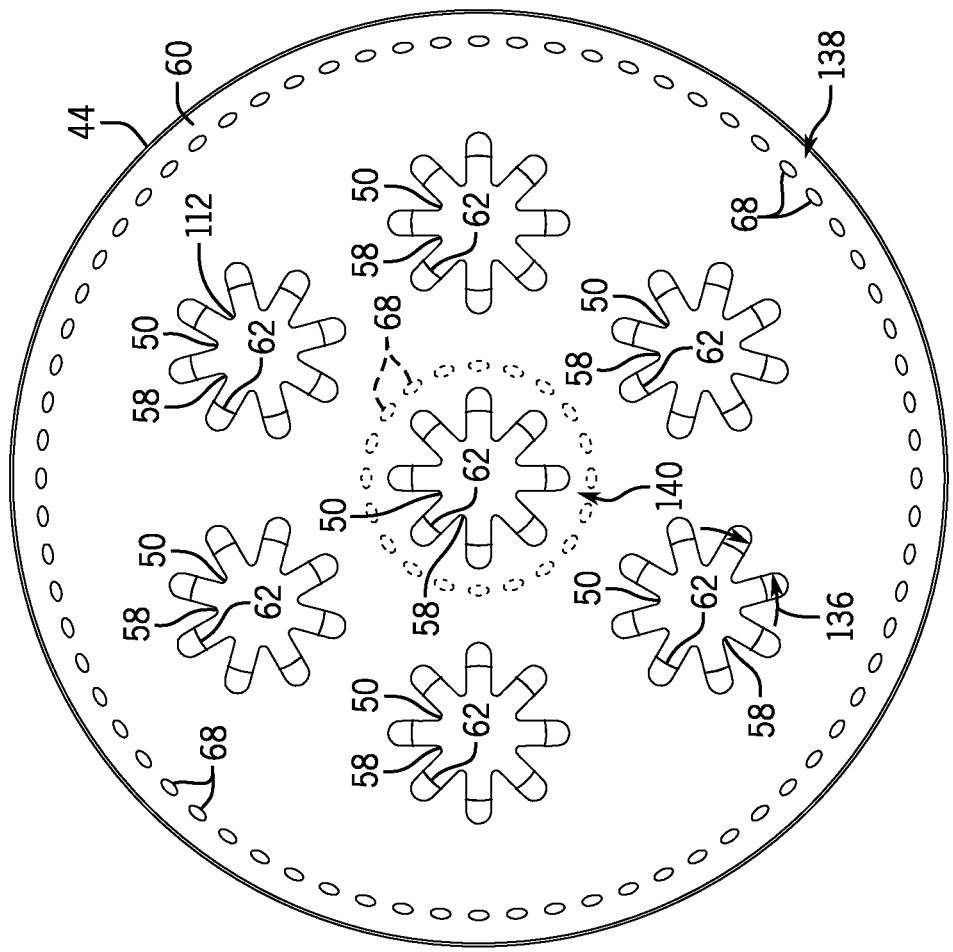
FIG. 6 is a front view of a hot side of the combustor cap of FIG. 3.

FIG. 6 is a front view of the hot side 60 of the combustor cap 44 of FIG. 3. FIG. 6 illustrates the downstream ends 58 of the nozzles 50 described above. As depicted, each nozzle 50 includes the structures 112 that extend radially 38 inward from the inner surface 62 of the nozzle 50 into a flow path of an air-fuel mixture through the nozzle 50. As depicted, each nozzle 50 includes eight structures 112. The number of structures 112 (e.g., radial protrusions, fins, lobes, etc.) extending from the inner surface 62 of each nozzle 50 may range from 1 to 30. The structures 112 form a lobed cross-sectional shape for each nozzle 50. In other embodiments, the cross-sectional shape of each nozzle 50 may be elliptical, rectilinear, or any other shape. As described above, the height 114 of the structures 112 may increase from the upstream end 54 to the downstream end 58 (see FIGS. 4 and 5). In certain embodiments, a width 136 of the structures 112 may increase from the upstream 54 to the downstream end 58.

In addition, FIG. 6 depicts the distribution of the outlets 68 on the hot side 60 of the combustor cap 44. For example, the outlets 68 are disposed circumferentially 40 about a periphery 138 of the combustor cap 44. In certain embodiments, the outlets 68 may be disposed about at hot spots on the hot side 60 of the combustor cap 44. As depicted, the outlets 68 (shown in dashed ellipses) are disposed at a potential hot spot 140 near the central nozzle 50. In other embodiments, the outlets 68 may be disposed at other locations of potential hot spots on the hot side 60 of the combustor cap 44. By locating the outlets 68 about the periphery or adjacent hot spots, the impingement air may be exhausted in those spots in greater need of cooling, while also minimizing interference with the combustion zone downstream of the combustor cap 44. In other words, the spent impingement or cooling air may be routed and exhausted out strategically to minimize emissions, while improving turndown and flame stability. Although depicted as ellipses, the outlets 68 may include different shapes (e.g., rectilinear, triangular, star-shaped, circular, polygonal, hexagonal, t-shaped, chevron shaped, or any combination thereof).

Figure 7:
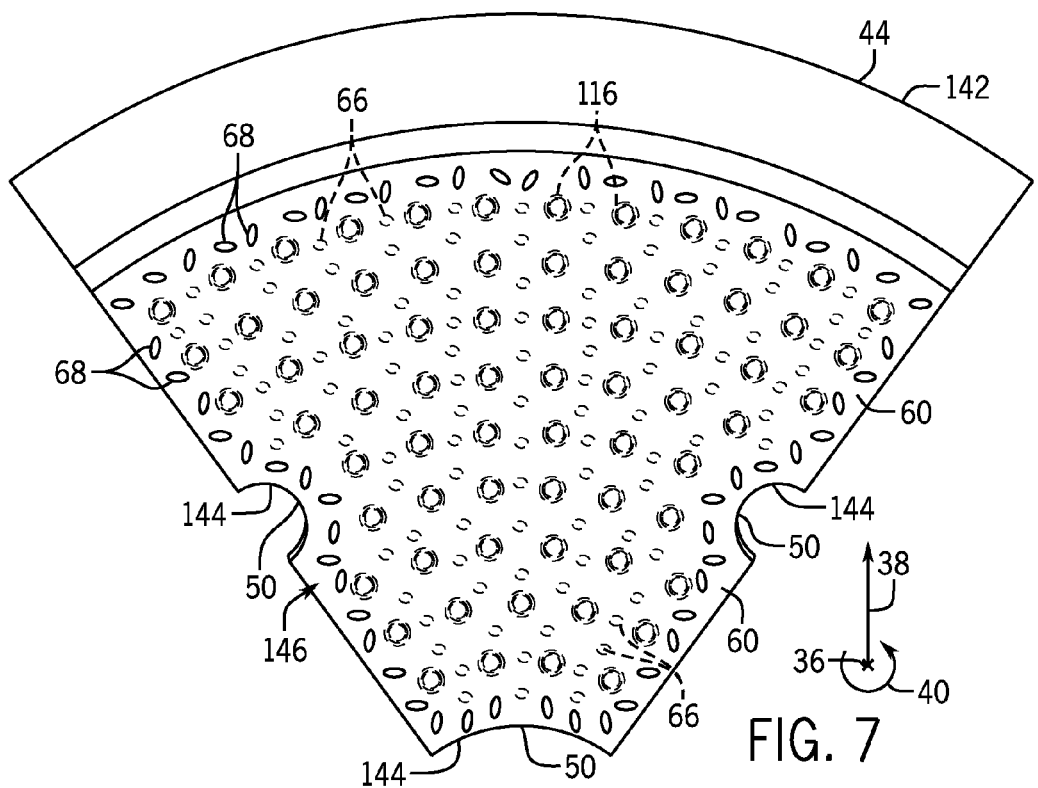
FIG. 7 is a front view of a hot side of a sector of a combustor cap.

FIG. 7 is a front view of the hot side 60 of a sector 142 of the combustor cap 44. As described above, the combustor cap 44 may be made of a single piece or multiple sectors 142. The number of sectors 142 of the combustor cap 44 may range from 2 to 10. As depicted, the sector 142 includes the inlets 66 (shown dashed), the outlets 68, the raised structures 116 (shown dashed), and nozzle portions 144. When the sectors 142 of the combustor cap 44 are assembled together, adjacent nozzle portions 144 form a respective nozzle 50. As depicted, the nozzle portions 50 have a circular shape. When the sectors 142 of the combustor cap 44 are assembled together, the resulting nozzle 50 has a circular cross-sectional shape.

The inlets 66, outlets 68, and the raised structures 116 are as described above. The inlets 66 are disposed on the cool side 56 of the sector 142, while the outlets 68 are disposed on the hot side 60 of the sector 142. As described above, one or more inlets 66 and one or more outlets 68 may be coupled to each cooling cavity 64 within the combustor cap 44. The raised structures 116 extend from the inner surface 118 of the cool side 56 of the sector 142. As depicted, the inlets 66 have a circular shape, while the outlets 68 have an elliptical or oval shape. The shapes of the inlets 66 and the outlets 68 may differ from those depicted (e.g., rectilinear, triangular, star-shaped, polygonal, hexagonal, t-shaped, chevron shaped, or any combination thereof).

As depicted, the inlets 66 are disposed about and between the raised structures 116 and nozzles portions 144. The outlets 68 are disposed about a periphery 146 of the hot side 60 of the sector 142. By locating the outlets 68 about the periphery 146 of the sector 142 or adjacent hot spots on the hot side 60 of the sector, the impingement air may be exhausted in those spots in greater need of cooling, while also minimizing interference with the combustion zone downstream of the combustor cap 44. In other words, the spent impingement or cooling air may be routed and exhausted out strategically to minimize emissions, while improving turndown and flame stability.

Figure 8:
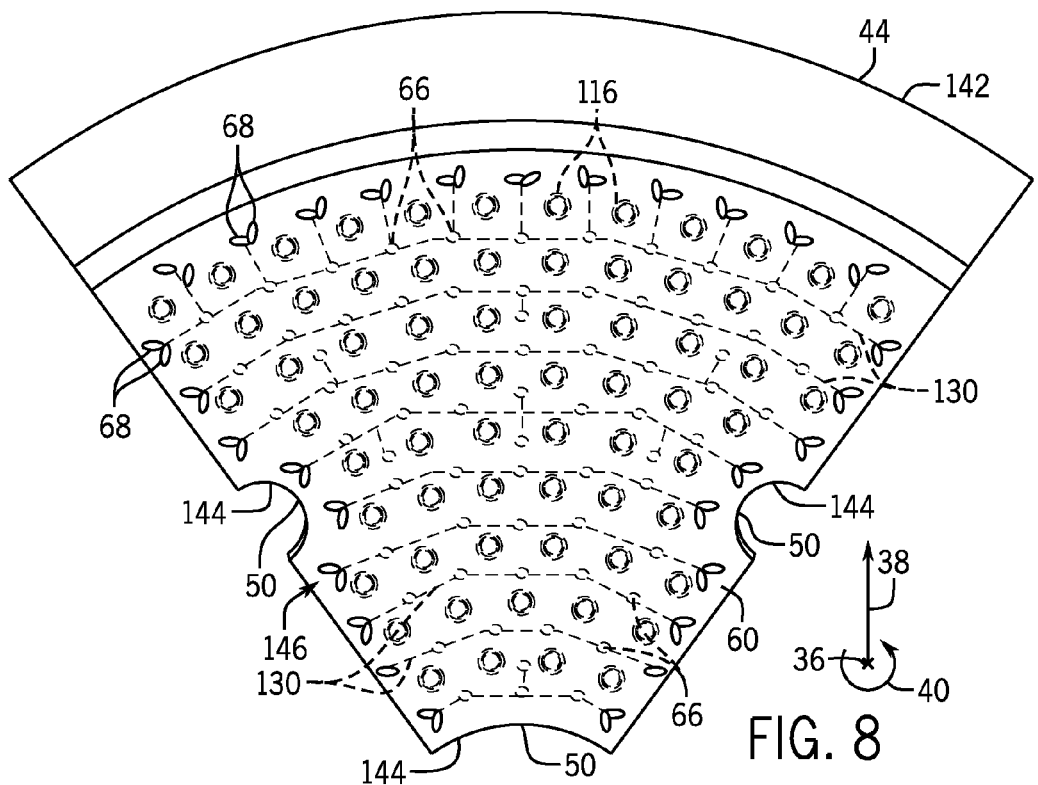
FIG. 8 is a front view of a hot side of a sector of a combustor cap having cooling channels within the sector.

FIG. 8 is a front view of the hot side 60 of the sector 142 of the combustor cap 44 having cooling channels 130 within the sector 142. The sector 142 and its components are as described in FIG. 7. In addition, as depicted, the sector 142 includes cooling channels 130. The cooling channels 130 interconnect (e.g., fluidly coupled) one or more of the inlets 66 and one or more of the outlets 68 of the cooling cavities 62. As depicted, the cooling channels 130 may extend radially 38 or circumferentially 40 through the sector 142 and/or single piece combustor cap 44. In certain embodiments, the cooling channels 130 and/or cavities 62 include a respective structure or fin 132 (see FIG. 5) that extends from the inner surface 126 of the cap 44 and/or sector 142 adjacent the hot side 60 towards the inner surface 118 of the cap 44 adjacent the cool side 56 of the cap 44 (e.g., opposite to direction 36). The internal cooling features of the combustor cap 44 enable uniform impingement cooling (e.g., zero cross-flow impingement cooling) that does not degrade due to cross-flow accumulation. Together, the cooling features (e.g., nozzle 50, structures 116, etc.) of the combustor cap 44 also provide a simpler structure for the cap 44 (i.e., fewer parts), reduced costs, and longer life for components of the combustor 16. In certain embodiments, the sector 142 in FIGS. 7 and 8 may also include the outer coating 128 disposed on the hot side 60 as described above in FIG. 4.

Figure 9:
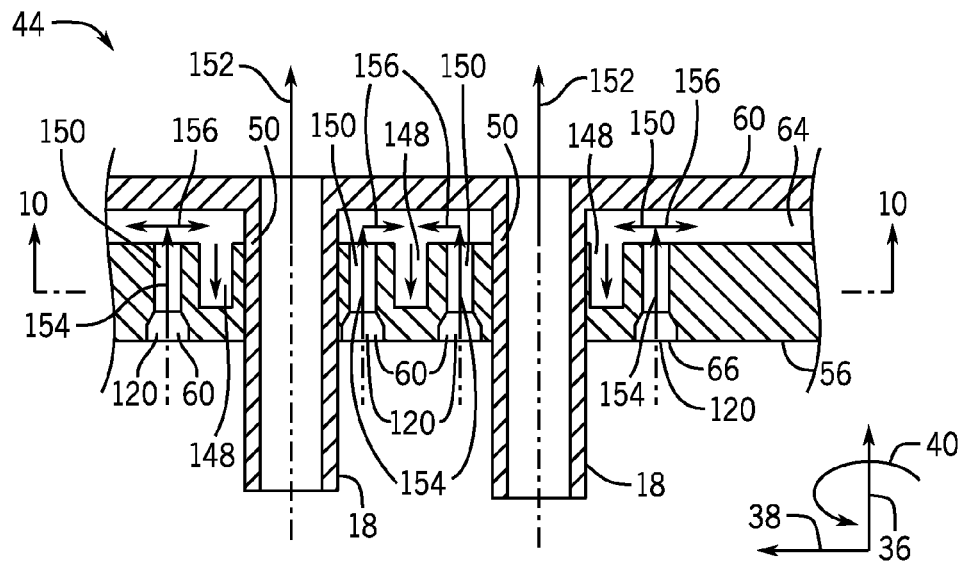
FIG. 9 is a cross-sectional side view of an embodiment of a portion of a combustor cap having exhaust or cooling channels.
Figure 10:
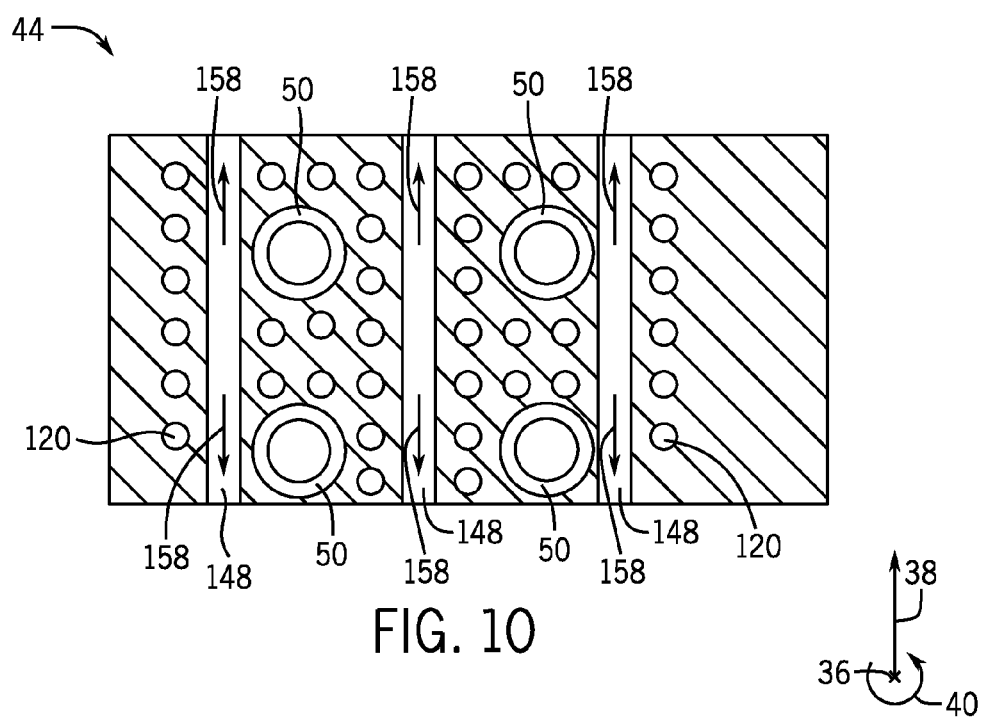
FIG. 10 is a cross-sectional view of an embodiment of the portion of the combustor cap of FIG. 9, taken along line 10-10.

In certain embodiments, cooling channels may not be directly coupled to the inlets 66. FIG. 9 is a cross-sectional side view of a portion of the combustor cap 44 having cooling channels 148 (e.g., flow trenches, exhaust channels). FIG. 10 is cross-sectional side view of the combustor cap 44 of FIG. 9. As described above, the mixing tube 18 are coupled to the nozzles 50. The air passages 120 are disposed adjacent to and between the nozzles 50. The combustor cap 44 includes the cooling cavity 64 between the cool side 56 (e.g., upstream side) and the hot side 60 (e.g., downstream side). The air passages 120 extend through the cool side 56 of the combustor cap 44. The air passages 120 include the inlets 66 (e.g., air inlets) and outlets 150 (e.g., air outlets). The outlets 150 interface with the cooling cavity 64. As depicted, the cool side 56 of the combustor cap 44 includes multiple cooling channels 148 that extend radially 38 between the air passages 120 and/or the nozzles 50. The cooling channels 148 also extend partially in the axial direction 36 into the cool side 56 of the combustor cap 44.

As described above, an air-fuel mixture flows axially 36 through the tubes 18 and the nozzles 50 into the combustion region 74 as indicated by arrows 152. Air (e.g., impingement air) flows axially 36 into the air passages 120 (e.g., via inlets 66) and into the cooling cavity 68 (e.g., via outlets 150) as indicated by arrows 154. The air flows throughout the cavity 68 as indicated by arrows 156. A portion of the air within the cooling cavity 68 flows axially 36 into the cooling channels 148. Then the air flows along the channels 148 (e.g., radially 38), as indicated by arrows 158, until the air exits the combustor cap 44 (e.g., via outlets 68 described above). The channels 148 provide additional flow area for spent impingement air, while also reducing any cross-flow momentum.

Technical effects of the disclosed embodiments include providing the combustor cap 44 that includes one or more cooling features. The cooling features may include cooling cavities 64 and/or cooling channels 130 coupled to the inlets 66 and/or the outlets 68. Structures 112, 116 may extend from the inner surfaces of the combustor cap 44 within the cavities 64 and/or channels 130. Together, these structures 112, 116, cavities 64, channels 130, inlets 66, and outlets 68 act together to enable zero cross-flow impingement cooling internally within the combustor cap 44. The combustor cap 44 includes additional cooling features such as the nozzles 50 that are thermally coupled together with the mixing tubes 18 to convectively cool the combustor cap 44. Together, the cooling features of the combustor cap 44 also provide a simpler structure for the cap 44 (i.e., fewer parts), reduced costs, and longer life for components of the combustor 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a combustor cap assembly for a multi-tube fuel nozzle, comprising:
        a support structure defining an interior volume configured to receive an air flow;
        a plurality of mixing tubes disposed within the interior volume, wherein each mixing tube comprises an upstream end and a downstream end, and wherein each mixing tube is configured to receive fuel through the upstream end, to mix air and the fuel to form an air-fuel mixture, and to discharge the air-fuel mixture through the downstream end into a combustion chamber;
        a combustor cap removably coupled to the support structure downstream of the plurality of mixing tubes, wherein the combustor cap interfaces with the combustion chamber and comprises a plurality of nozzles integrated within the combustor cap, each nozzle of the plurality of nozzles directly contacts a respective downstream end of a respective mixing tube of the plurality of mixing tubes, and wherein the combustor cap is configured to internally cool itself via the plurality of nozzles and one or more cooling features integrated within the combustor cap.

2. The system of claim 1, wherein each mixing tube of the plurality of mixing tubes is configured to be thermally coupled to the combustor cap via a respective nozzle of the plurality of nozzles.

3. The system of claim 1, wherein each nozzle of the plurality of nozzles comprises structures that extend radially inward relative to a longitudinal axis of the combustor cap assembly from an inner surface of the respective nozzle into a flow path of the air-fuel mixture through the respective nozzle.

4. The system of claim 1, wherein the one or more cooling features comprise cooling cavities disposed internally within the combustor cap adjacent one or more of the plurality of nozzles.

5. The system of claim 4, wherein the combustor cap comprises a first surface facing the plurality of mixing tubes and a second surface disposed opposite the first surface, one or more of the cooling cavities include an inlet disposed on the first surface and configured to receive impingement air flow into the combustor cap, and one or more of the cooling cavities include an outlet disposed on the second surface and configured to enable the exit of the impingement air flow from the combustor cap.

6. The system of claim 5, wherein the outlets are disposed about a periphery of the second surface of the combustor cap.

7. The system of claim 5, wherein the combustor cap comprises a plurality of sectors, each sector having the first and second surfaces, and the outlets are disposed about a periphery of one or more of the sectors.

8. The system of claim 5, wherein the combustor cap comprises cooling channels disposed internally within the combustor cap that fluidly couple at least a portion of the cooling cavities to each other.

9. The system of claim 8, wherein the combustor cap comprises structures that extend into the cooling channels from an internal surface of the combustor cap into the impingement air flow.

10. The system of claim 5, wherein each respective outlet of the cooling cavities is configured to enable internal, zero-cross flow cooling of the combustor cap by directing exit of the impingement air flow from the combustor cap in a direction that does not interfere with or cross-flow with other impingement air flows downstream of the combustor cap.

11. The system of claim 1, wherein the combustor cap comprises a first surface facing the plurality of mixing tubes, a second surface disposed opposite the first surface, and a thermal barrier coating disposed on the second surface.

12. The system of claim 1, wherein the combustor cap comprises a first surface facing the plurality of mixing tubes, a second surface disposed opposite the first surface, and a catalyst configured to reduce exhaust products disposed on the second surface.

13. The system of claim 1, comprising a gas turbine engine, a combustor, or the multi-tube fuel nozzle having the combustor cap assembly.

14. A system, comprising:
    a combustor cap configured to interface with a combustion chamber and to be coupled to a plurality of mixing tubes of a multi-tube fuel nozzle, wherein each mixing tube of the plurality of mixing tubes comprises an upstream end and a downstream end and is configured to receive fuel through the upstream end, to mix air and the fuel to form an air-fuel mixture, and to discharge the air-fuel mixture through the downstream end into the combustion chamber, the combustor cap comprises a plurality of nozzles integrated within the combustor cap, each nozzle of the plurality of nozzles is configured to directly contact a respective downstream end of a respective mixing tube of the plurality of mixing tubes, and the combustor cap is configured to internally cool itself via the plurality of nozzles and one or more cooling features integrated within the combustor cap.

15. The system of claim 14, wherein each nozzle of the plurality of nozzles comprises structures that extend radially inward relative to longitudinal axes of the plurality of mixing tubes from an inner surface of the respective nozzle of the plurality of nozzles into a flow path of the air-fuel mixture through the respective nozzle.

16. The system of claim 14, wherein the combustor cap comprises a first surface configured to face the plurality of mixing tubes and a second surface disposed opposite the first surface, the one or more cooling features comprise cooling cavities disposed internally within the combustor cap adjacent one or more of the plurality of nozzles, one or more of the cooling cavities include an inlet disposed on the first surface and configured to receive impingement air flow into the combustor cap, and one or more of the cooling cavities include an outlet disposed on the second surface and configured to enable the exit of the impingement air flow from the combustor cap.

17. The system of claim 16, wherein the combustor cap comprises cooling channels disposed internally within the combustor cap that fluidly couple at least a portion of the cooling cavities to each other.

18. A system, comprising:
   a combustor cap configured to interface with a combustion chamber and to be coupled to a plurality of mixing tubes of a multi-tube fuel nozzle, wherein each mixing tube of the plurality of mixing tubes comprises an upstream end and a downstream end and is configured to receive fuel through the upstream end, to mix air and the fuel to form an air-fuel mixture, and to discharge the air-fuel mixture through the downstream end into the combustion chamber, wherein the combustor cap comprises a first surface configured to directly face the downstream ends of the plurality of mixing tubes, a second surface disposed opposite the first surface that directly interfaces with the combustion chamber, and cooling cavities integrated within the combustor cap and configured to internally cool the combustor cap, wherein one or more of the cooling cavities include an inlet disposed on the first surface and configured to receive impingement air flow into the combustor cap, and one or more of the cooling cavities include an outlet disposed on the second surface and configured to enable the exit of the impingement air flow from the combustor cap.

19. The system of claim 18, wherein the combustor cap comprises a plurality of nozzles integrated within the combustor cap that are configured to internally cool the combustor cap, each nozzle of the plurality of nozzles is configured directly contact a respective downstream end of a respective mixing tube of the plurality of mixing tubes, and one or more of the cooling cavities are disposed internally within the combustor cap adjacent one or more of the plurality of nozzles.

* * * * *